United States Patent
Lawson et al.

(10) Patent No.: US 8,979,139 B2
(45) Date of Patent: Mar. 17, 2015

(54) HYDRAULIC TUBE ASSEMBLY FOR A HYDRAULIC SYSTEM

(71) Applicant: Caterpillar Global Mining LLC, Oak Creek, WI (US)

(72) Inventors: Andrew F. Lawson, Milwaukee, WI (US); Alan D. Nickel, Burlington, WI (US); Robert D. Weber, Wadsworth, IL (US)

(73) Assignee: Catepillar Global Mining LLC, Oak Creek, WI (US)

( * ) Notice: Subject to any disclaimer, the term of this patent is extended or adjusted under 35 U.S.C. 154(b) by 114 days.

(21) Appl. No.: 13/621,774

(22) Filed: Sep. 17, 2012

(65) Prior Publication Data

US 2014/0077493 A1 Mar. 20, 2014

(51) Int. Cl.
  *F16L 23/00* (2006.01)
(52) U.S. Cl.
  CPC ............... *F16L 23/003* (2013.01); *F16L 23/00* (2013.01)
  USPC .......................................... 285/368; 285/412
(58) Field of Classification Search
  USPC ......................................... 285/368, 412, 114
  See application file for complete search history.

(56) References Cited

U.S. PATENT DOCUMENTS

| | | | | | |
|---|---|---|---|---|---|
| 3,144,261 | A | * | 8/1964 | Stephens | 285/114 |
| 3,252,192 | A | * | 5/1966 | Smith | 285/114 |
| 3,387,867 | A | * | 6/1968 | Rogers | 285/368 |
| 3,507,506 | A | * | 4/1970 | Tillman | 285/363 |
| 3,603,617 | A | * | 9/1971 | Lochridge | 285/368 |
| 4,073,402 | A | * | 2/1978 | Wood | 285/368 |
| 4,317,586 | A | * | 3/1982 | Campbell | 285/95 |
| 4,672,728 | A | * | 6/1987 | Nimberger | 285/414 |
| 5,292,155 | A | * | 3/1994 | Bell et al. | 285/114 |
| 6,929,287 | B2 | * | 8/2005 | Flindall | 285/18 |
| 7,641,240 | B2 | * | 1/2010 | Seaton | 285/368 |
| 8,534,713 | B2 | * | 9/2013 | Takeda et al. | 285/368 |
| 8,616,590 | B2 | * | 12/2013 | Travis et al. | 285/416 |

FOREIGN PATENT DOCUMENTS

| | | |
|---|---|---|
| JP | 05-079590 | 3/1993 |
| JP | 2006-329387 | 12/2006 |

* cited by examiner

*Primary Examiner* — David E Bochna
(74) *Attorney, Agent, or Firm* — Foley & Lardner LLP

(57) ABSTRACT

A hydraulic tube assembly for connecting two hydraulic components in a hydraulic system is provided. The hydraulic tube assembly may include a first hydraulic component, a second hydraulic component, a tube subassembly, and at least one port connection subassembly. The tube subassembly may include a tube having two ends, a first packing box, and a second packing box. The port connection subassembly may have two ends, with a first end coupled to the tube subassembly and a second end coupled to a hydraulic component. The port connection subassembly may include a packing box flange, at least one tension rod, at least one fluid seal, and a connecting cylinder flange.

19 Claims, 5 Drawing Sheets

HYDRAULIC TUBE ASSEMBLY FOR A HYDRAULIC SYSTEM

TECHNICAL FIELD

This disclosure relates generally to the field of hydraulic pressure systems, and more particularly to an adjustable hydraulic tube assembly for a large mobile hydraulic system.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

High pressure hydraulic systems (where system pressure is greater than 100 Bar) are often limited in the inner diameter of hose or tube that can be used before the burst pressure (i.e., pressure at which the hose will burst) falls below the working limit of the system. If large flows are required within these systems, it is often necessary to use thick-walled tubes. The fabrication process for these thick-walled tubes involves large tolerance ranges. The tolerance ranges of the tubes along with the tolerance ranges of the other components within the system often stack up, resulting in two connection points being out of plane with each other or otherwise misaligned.

Conventional joints are sometimes used to connect two points that are misaligned, but it can be difficult to connect the points without the conventional joints leaking or failing, in part because conventional joints may not maintain a proper seal. Often, the two points are misaligned in more than one direction. Conventional joints for high pressure, high flow hydraulic systems typically do not provide a way to connect two points that are misaligned in more than one plane, without the joints leaking or failing. For instance, Japanese Patent No. JP 2006-329387 A discloses a variable valve mechanism with an adjusting bolt, but the adjusting bolt only allows for adjustment in a single plane.

SUMMARY

An embodiment of the present disclosure relates to a hydraulic tube assembly for connecting two hydraulic components in a hydraulic system. The hydraulic tube assembly includes a first hydraulic component, a second hydraulic component, and a tube subassembly. The tube subassembly includes a tube having two ends, and the tube is configured to transfer high pressure, high flow hydraulic fluid between the first hydraulic component and the second hydraulic component. The tube subassembly also includes a first packing box coupled to a first tube end, and a second packing box coupled to a second tube end.

In this embodiment, the hydraulic tube assembly also includes at least one port connection subassembly having two ends, a first port connection subassembly end coupled to the tube subassembly, and a second port connection subassembly end configured to couple to at least one hydraulic component. The port connection subassembly includes a packing box flange configured to couple to at least one hydraulic component, and at least one tension rod having two ends. A first end of the at least one tension rod is coupled to the tube subassembly and a second end of the at least one tension rod is coupled to the packing box flange. The port connection subassembly also includes a connecting cylinder flange having two ends, a first cylinder flange end disposed within the packing box flange, and a second cylinder flange end disposed within the tube subassembly, the connecting cylinder flange being coupled to the tube subassembly. The port connection subassembly also includes at least one fluid seal disposed between the connecting cylinder flange and the tube subassembly.

Another embodiment of the present disclosure relates to a high pressure hydraulic tube subassembly. The high pressure hydraulic tube subassembly includes a tube having two ends, the tube configured to transfer high pressure, high flow hydraulic fluid between two hydraulic components. The tube subassembly also includes a first packing box having two ends, a first packing box first end coupled to a first tube end, a first packing box second end configured to couple to at least one hydraulic component. The high pressure hydraulic tube subassembly also includes a second packing box having two ends, a second packing box first end coupled to a second tube end, a second packing box second end configured to couple to a port connection subassembly.

Another embodiment of the present disclosure relates to a port connection subassembly having two ends, a first port connection subassembly end configured to couple to a hydraulic component, and a second port connection subassembly end configured to couple to a tube subassembly. The port connection subassembly includes a packing box flange configured to couple to the hydraulic component. The port connection subassembly also includes at least one tension rod having two ends, a first tension rod end coupled to the packing box flange, and a second tension rod end configured to couple to the tube subassembly. The port connection subassembly also includes a connecting cylinder flange having two ends, a first cylinder flange end disposed within the packing box flange, and a second cylinder flange end configured to be disposed within the tube subassembly, the connecting cylinder flange configured to couple to the tube subassembly. Further, the port connection subassembly includes at least one fluid seal configured to seal the port connection subassembly from fluid leaks.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
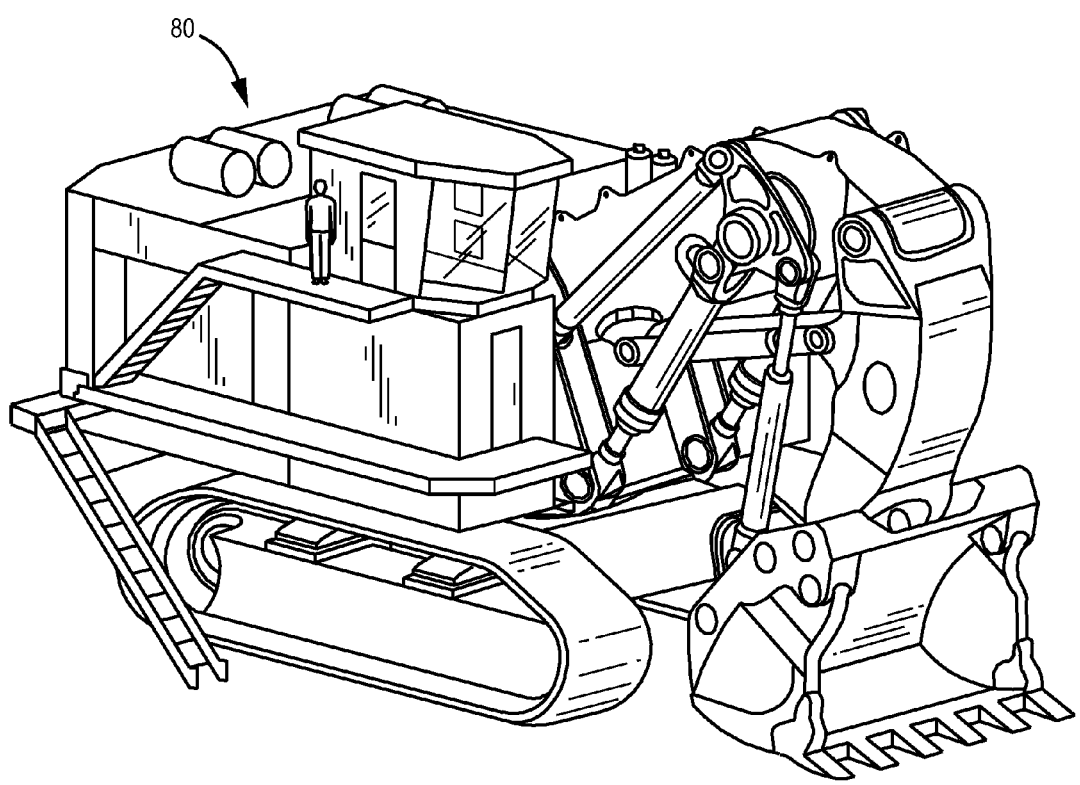
FIG. 1 is a hydraulic mining shovel, according to an exemplary embodiment.

Referring to FIG. 1, a hydraulic mining shovel is shown. The hydraulic mining shovel 80 is typical of the type of hydraulic equipment that will utilize the hydraulic tube assembly 10 (shown in FIG. 2) of the present embodiment.

Figure 2:
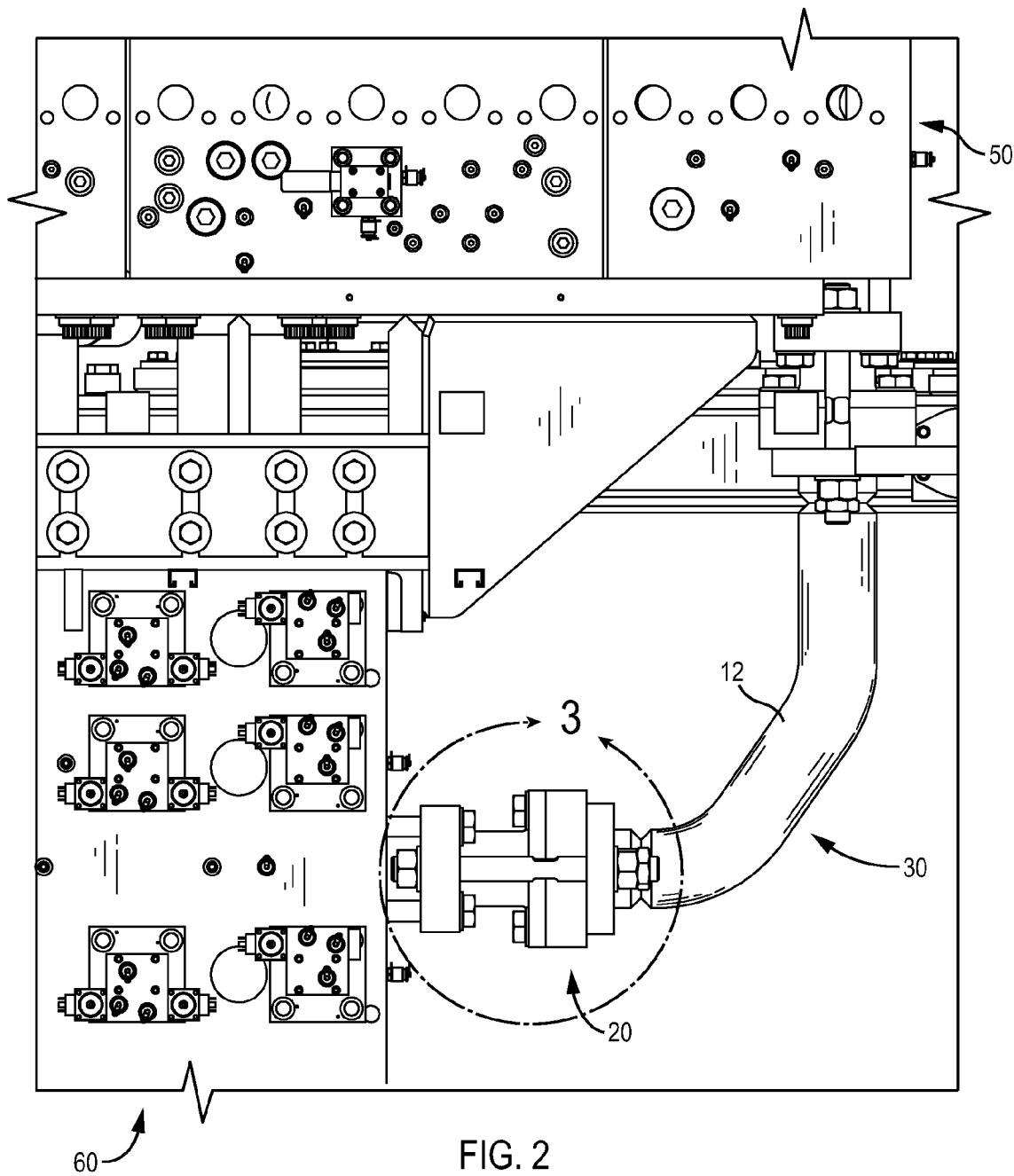
FIG. 2 is a side view of the hydraulic tube assembly of the present disclosure, according to an exemplary embodiment.

Referring now to FIG. 2, the hydraulic tube assembly of the present disclosure is shown, according to an exemplary embodiment. In exemplary embodiments, the hydraulic tube assembly 10 is used to connect two hydraulic components, such as hydraulic manifolds, within a high pressure, high flow hydraulic system. In further exemplary embodiments, the hydraulic tube assembly 10 is configured to transfer hydraulic fluid at pressures greater than approximately 100 bar, and at flows greater than approximately 380 liters per minute. In the illustrated embodiment of FIG. 2, the hydraulic tube assembly 10 is shown connecting a pump control manifold 60 and a clam control manifold 50. The pump control manifold 60 and clam control manifold 50 are both examples of hydraulic components that may be connected by the hydraulic tube assembly 10 of the present disclosure. The hydraulic tube assembly 10 is adjustable in more than one plane, and is intended to allow for a more secure connection between the two high pressure manifolds 50 and 60. In exemplary embodiments, the hydraulic tube assembly 10 is intended to connect the high pressure manifolds 50 and 60 without the joints leaking or failing, and to supply enough fluid flow to meet the desired work cycle times of the hydraulic equipment. According to other embodiments, the hydraulic tube assembly 10 may be used in a wide variety of other high pressure, high flow hydraulic applications.

According to the embodiment illustrated in FIG. 2, a first end of the hydraulic tube assembly 10 is substantially vertical and coupled to the clam control manifold 50, and a second end of the hydraulic tube assembly 10 is substantially horizontal and coupled to the pump control manifold 60. However, the manifolds 50 and 60 shown are for illustration only, and the hydraulic tube assembly 10 can be used to connect any two fluid components within a high pressure, high flow hydraulic system having any connection configuration or orientation.

In the illustrated embodiment of FIG. 2, the hydraulic tube assembly 10 includes a "bent" tube subassembly 30 and two port connection subassemblies 20. The bent tube subassembly 30 (isolated for clarity in FIGS. 6-7) has two ends and is coupled to a port connection subassembly 20 on each end.

The bent tube subassembly 30 includes a "bent" tube 12. In the illustrated embodiment of FIG. 2, the tube 12 is shaped so that the two tube ends are substantially perpendicular to each other. The tube 12 is configured in this way to fluidly connect the two manifolds 50 and 60. In other embodiments, however, the tube 12 may be un-bent or may be bent or otherwise shaped in any manner suitable for the particular application. In exemplary embodiments, the tube 12 has a relatively large inner diameter (at least approximately 63.5 millimeters) and is intended to receive relatively large flows of hydraulic fluid. The tube 12 has walls with sufficient thickness so that the burst pressure of the hydraulic tube assembly 10 is greater than the working limit of the high pressure, high flow hydraulic system. The tube 12 is intended to transfer hydraulic fluid in high pressure, high flow hydraulic systems, like the system shown in FIG. 2. In exemplary embodiments, the tube 12 is configured to transfer hydraulic fluid at pressures greater than approximately 100 bar, and at fluid flows greater than approximately 380 liters per minute. The bent tube subassembly 30 may also include other components that are shown in more detail in FIGS. 6-7.

On each end of the bent tube subassembly 30 is a port connection subassembly 20. The port connection subassembly 20 is intended to be the adjustable portion of the hydraulic tube assembly 10. In this embodiment, the port connection subassemblies 20 are utilized to connect the hydraulic tube assembly 10 to the corresponding hydraulic port connection on the manifolds 50 and 60. The port connection subassemblies 20 are able to move in at least two planes in order to accommodate and connect misaligned manifolds 50 and 60. The connection subassembly 20 is intended to couple the bent tube subassembly 30 portion of the hydraulic tube assembly 10 to corresponding hydraulic port connection points on both manifolds 50 and 60. The port connection subassembly 20 is shown in more detail in FIGS. 3-5.

Figure 3:
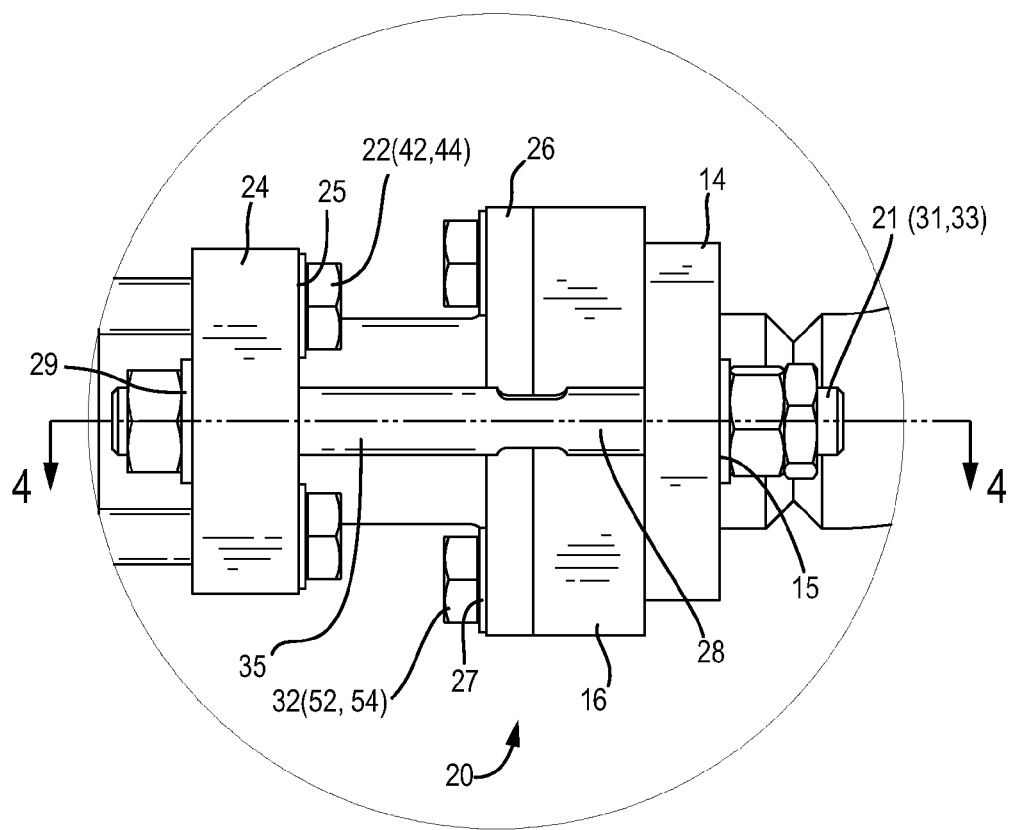
FIG. 3 is a magnified view of the connection shown in FIG. 2 between the hydraulic assembly system and the pump control manifold.

Referring now to FIG. 3, details of the port connection subassembly 20 are shown. In exemplary embodiments, the connection subassembly 20 connects the hydraulic tube assembly 10 to a hydraulic port. The connection subassembly 20 includes a packing box flange 24. The packing box flange 24 is approximately hexagonal in shape in this exemplary embodiment, but may be of any shape suitable for the particular application. The packing box flange 24 is coupled directly to the corresponding hydraulic port connection points on the manifold 60 in this embodiment.

The packing box flange 24 is shown to include four packing box holes 25 configured to receive locking assemblies 22. However, the flange 24 may include any number of packing box holes 25 suitable for the particular application. In this exemplary embodiment, the packing box holes 25 are enlarged to a diameter greater than the diameter of the locking assembly 22, which is intended to allow adjustment of the hydraulic tube assembly 10 in the horizontal and vertical directions. In exemplary embodiments, the enlarged holes 25 allow the packing box flange 24 to move vertically and horizontally with respect to the manifold 60 while still allowing space to attach the locking assemblies 22. According to FIG. 2, the enlarged holes 25 allow movement in the up-down direction, as well as along the z-axis, into or out of the page.

Still referring to FIG. 3, the packing box flange 24 is coupled to the corresponding hydraulic port connection point on the manifold 60 by four locking assemblies 22 in this embodiment. However, the flange 24 may be coupled to the corresponding hydraulic port connection point on the manifold 60 by as many locking assemblies 22 as are suitable for the particular application, or by any other suitable method. The locking assemblies 22 include a screw 42 and a washer 44. The manifold 60 is tapped, so that the screw 42 is inserted through the packing box holes 25 and received by tapped holes (not shown) in the manifold 50 or 60, locking the packing box flange 24 to the corresponding hydraulic port connection points on the manifold 60.

The connection subassembly 20 also includes a connecting cylinder flange 26, in exemplary embodiments. In the illustrated embodiment of FIG. 3, the connecting cylinder flange 26 is coupled to each end of the bent tube subassembly 30. The flange 26 includes a cylinder portion 35 with two ends, a first end disposed within the packing box flange 24 and intended to provide a fluid connection to the manifold 60, and a second end disposed within the packing box 16 and intended to provide a fluid connection to the bent tube subassembly 30.

The packing box flange 24 includes at least three seals 34 (shown in FIG. 4), which are configured to provide a fluid seal between the packing box flange 24 and the cylinder portion 35 of the connecting cylinder flange 26. The seals 34 may include an o-ring, a backup o-ring, and a wiper seal (shown as three seals 34 in FIG. 4) in this embodiment. The seals 34 are disposed within the inner diameter of the packing box flange 24. In other embodiments, the seals 34 can be of any shape or type suitable for the particular application. The seals 34 are intended to provide sealing for high pressure hydraulic fluid even when there is relative motion between the seals 34 and the connecting cylinder flange 26. In exemplary embodiments, the seals 34 are made from a synthetic rubber, but may be made of any other rubber type sealing material in other embodiments.

Figure 6:
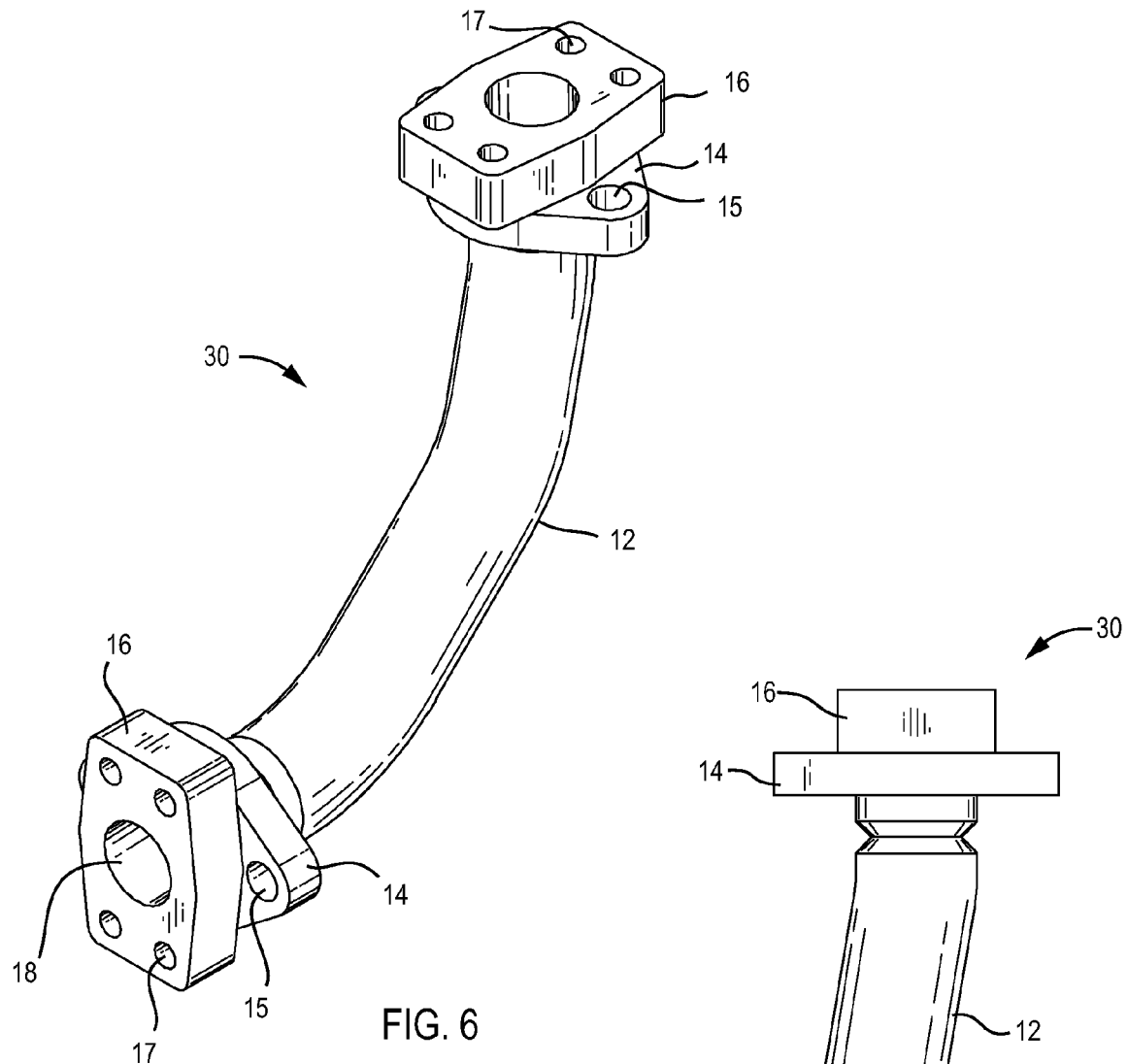
FIG. 6 is an isolated view of the bent tube subassembly, according to an exemplary embodiment.
Figure 7:
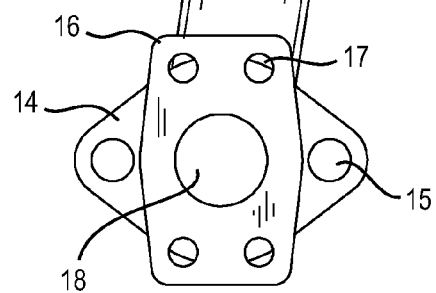
FIG. 7 is a back view of the bent tube subassembly of FIG. 6.

The connecting cylinder flange 26 also includes cylinder flange holes 27 that are configured to align with the packing box holes 17 (shown in FIG. 6) on the packing box 16 (part of the bent tube subassembly 30 shown more clearly in FIGS. 6-7). In this embodiment, the flange 26 includes four cylinder flange holes 27, but the flange 26 may include any number of holes 27 suitable for connecting the flange 26 to the packing box 16.

The second end of the cylinder portion 35 of the connecting cylinder flange 26 is disposed within the packing box 16, and is intended to provide a fluid connection from the port connection subassembly 20 to the bent tube subassembly 30. The connecting cylinder flange 26 is coupled to the packing box 16 by four locking assemblies 32 in the illustrated embodiment of FIG. 3. However, in other embodiments, the port connection subassembly 20 may include any number of locking assemblies 32 suitable for the particular application, and the connecting cylinder flange 26 may be coupled to the packing box 16 by any other suitable method. In the illustrated embodiment of FIG. 3, the locking assembly 32 includes a screw 52 and a washer 54, but in other embodiments the locking assembly 32 may include any other suitable fastening materials. In exemplary embodiments, the packing box 16 is tapped, so that the packing box 16 is configured to receive the screw 52 and secure the locking assembly 32, which is intended to lock the packing box 16 to the connecting cylinder flange 26.

The packing box 16 also includes at least an o-ring seal 37 (shown in FIG. 4) in this embodiment, which is configured to provide a fluid seal between the packing box 16 and the cylinder portion 35 of the connecting cylinder flange 26. The o-ring seal 37 is disposed between the packing box 16 and the connecting cylinder flange 26 and secured by the locking assemblies 32. In this embodiment, the o-ring seal 37 has an o-shape, but in other embodiments the o-ring seal 37 may be of any shape or type suitable for the particular application. The o-ring seal 37 is intended to provide sealing for high pressure hydraulic flow even when there is relative motion between the o-ring seal 37 and the connecting cylinder flange 26. In exemplary embodiments, the o-ring seal 37 is made from a synthetic rubber, but may be made of any other rubber type sealing material in other embodiments.

The connection subassembly 20 of the illustrated embodiment of FIG. 3 also includes at least two tension rods 28. The tension rods 28 couple the bent tube subassembly 30 to the packing box flange 24, and are intended to secure the fluid connection between the bent tube subassembly 30 and the manifold 60 in this embodiment. Each tension rod 28 has two ends, with one end disposed within a clamping flange aperture 15 and coupled to the clamping flange 14 portion of the bent tube subassembly 30, and a second end disposed within a tension rod hole 29 (identified but not shown) and coupled to the packing box flange 24.

The tension rods 28 are coupled to both the clamping flange 14 and the packing box flange 24 by tension rod locking assemblies 21. In exemplary embodiments, each tension rod locking assembly 21 includes a washer 31 and a nut 33, with the washer 31 sliding over the tension rod 28 and a nut 33 attaching onto the end of the tension rod 28. The nut 33 locks the washer 31 to the clamping flange 14 or to the packing box flange 24. In this embodiment, the tension rods 28 and associated locking assemblies 21 connect the bent tube subassembly 30 to the manifold 60.

The tension rods 28 are utilized to secure the fluid connection between the bent tube subassembly 30 and the two manifolds 50 and 60 in exemplary embodiments. Specifically, the tension rods 28 are configured to limit the motion of the connecting cylinder flange 26 in relation to the o-ring seal 37 and the seals 34. The tension rods 28 are intended to prevent the connecting cylinder flange 26 from losing contact with the seals 34, thus maintaining the fluid connection and preventing leaks within the hydraulic tube assembly 10. The tension rods 28 do allow the connecting cylinder flange 26 to move slightly without losing the fluid seal, in a plane perpendicular to the surface of the manifold 60, which may provide movement for the hydraulic tube assembly 10 in a third plane.

Figure 4:
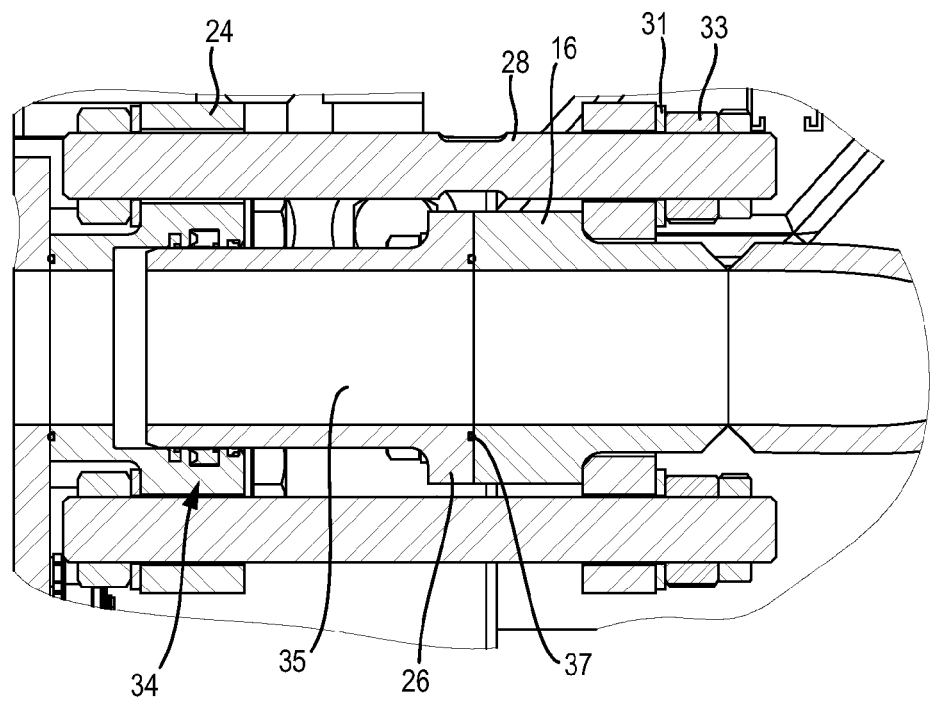
FIG. 4 is a cross-section view of the connection of FIG. 3, shown in the 4-4 direction.

Referring now to FIG. 4, a cross-section of the connection of FIG. 3 is shown, in the 4-4 direction. The cylinder portion 35 of the connecting cylinder flange 26 is shown more clearly in FIG. 4, the cylinder portion 35 providing the fluid connection between the bent tube subassembly 30 and the port connection subassembly 20. In the illustrated embodiment of FIG. 4, the cylinder portion 35 of the connecting cylinder flange 26 is disposed within the packing box 16, and the o-ring seal 37 is disposed between the flange 26 and the packing box 16, providing a fluid seal between the flange 26 and the box 16. In this embodiment, the packing box flange 24 includes at least three seals 34 within its inner diameter, which are intended to provide a fluid seal between the packing box flange 24 and the cylinder portion 35 of the connecting cylinder flange 26. The tension rods 28 secure the fluid connection, limiting the motion of the connecting cylinder flange 26, and preventing the flange 26 from losing contact with the seals 34.

Figure 5:
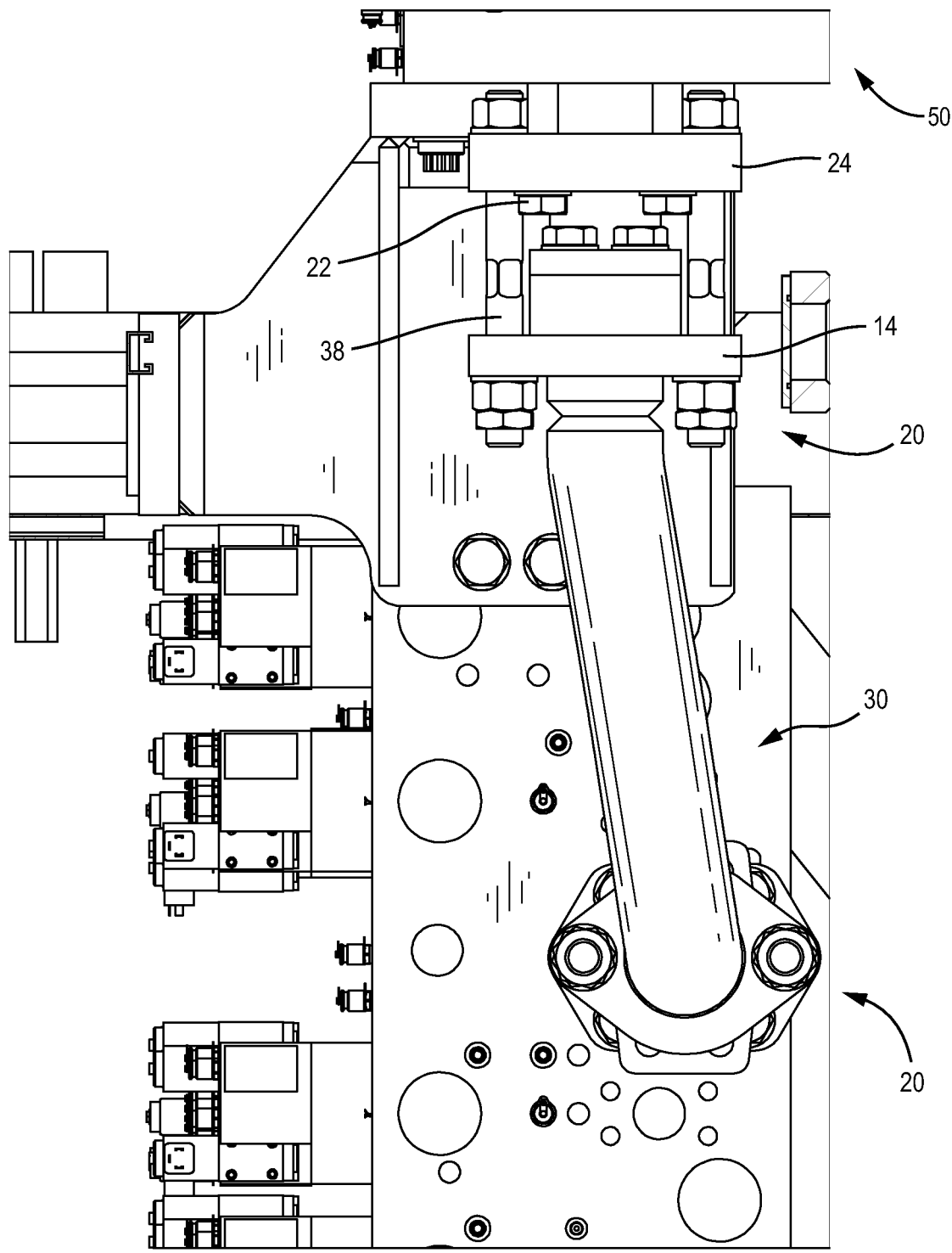
FIG. 5 is a back view of the hydraulic tube assembly of FIG. 2.

Referring now to FIG. 5, a view of the hydraulic tube assembly 10 of FIG. 2 is shown, in the 4-4 direction. FIG. 5 shows the coupling of the port connection subassembly 20 to the manifold 50 more clearly. The port connection subassembly 20 couples the bent tube subassembly 30 to the clam control manifold 50 in substantially the same way that the connection subassembly 20 couples the bent tube subassembly 30 to the pump control manifold 60, in this embodiment.

In FIG. 5, the port connection subassembly 20 includes a packing box flange 24, which is coupled to the manifold 50 by locking assemblies 22. The connection subassembly 20 also includes a cylinder flange 26 that is coupled to the packing box 16 on the bent tube subassembly 30 by locking assemblies 32. Two tension rods 38 are disposed within both the clamping flange 14 and the packing box flange 24, and the tension rods 38 are secured by locking assemblies 21. The bent tube subassembly 30 is fluidly coupled to the manifold 50 by the port connection subassembly 20.

The two port subassemblies 20 and the bent tube subassembly 30 form a hydraulic tube assembly 10 that fluidly connects the clam control manifold 50 and the pump control manifold 60 in this embodiment. In exemplary embodiments, the tension rods 38 allow the connecting cylinder flange 26 to move slightly without losing the fluid seal, in a plane substantially perpendicular to the surface of the manifold 50. The movement is intended to provide a way to connect two points that are misaligned in a third plane. The tension rods 38 maintain the fluid seal between the manifold 50 and the bent tube subassembly 30 by limiting the motion of the connecting cylinder flange 26, maintaining contact between the cylinder flange 26 and the seals 34.

Referring now to FIG. 6, an isolated view of the bent tube subassembly of FIG. 2 is shown, according to an exemplary embodiment. The bent tube subassembly 30 includes a bent tube 12, which is bent in a configuration to connect two hydraulic manifolds 50 and 60 (shown in FIG. 2) in this embodiment. In other embodiments, the tube 12 may be unbent or may be bent in any manner suitable for the particular application. The tube 12 is hollow and is intended to be used to transfer hydraulic fluid in high pressure, high flow hydraulic systems. In exemplary embodiments, the tube 12 will have thick walls in order to withstand a high pressure hydraulic fluid flow.

The bent tube subassembly 30 also includes a clamping flange 14 connected to each end of the bent tube 12. In exemplary embodiments, the clamping flange 14 is welded directly onto the bent tube 12, but the clamping flange 14 can be connected to the bent tube 12 in any manner that is suitable for the application and that is configured to prevent leaks in the hydraulic system. The clamping flange 14 is approximately diamond-shaped, with a flange aperture 15 on opposite corners of the diamond shape (shown more clearly in the horizontal alignment of FIG. 7). The flange apertures 15 are sized to hold a tension rod 28 or 38 (shown in FIGS. 3-5), which will secure the clamping flange 14, and thus the bent tube subassembly 30, to the manifolds 50 and 60 (shown in FIG. 2).

In the illustrated embodiment of FIG. 6, the bent tube subassembly 30 further includes two packing boxes 16, disposed at either end of the bent tube subassembly 30 and connected to each of the clamping flanges 14. The packing boxes 16 are somewhat rectangular in shape in the illustrated embodiment of FIG. 6, but may be of any shape suitable for the particular application. In this embodiment, the packing boxes 16 are rectangular in shape to help accommodate the connection from the clamping flanges 14 to the port connection subassembly 20 (shown in FIG. 2). The flange apertures 15 must have clearance from the packing boxes 16, so that tension rods 28 or 38 (shown in FIGS. 3-5) can be fitted through the flange apertures 15 and attached to the port connection subassembly 20.

The packing boxes 16 include four packing box holes 17 in this embodiment. In other embodiments, the packing boxes 16 could include more or less holes 17, depending on the application. Locking assemblies 32 may be disposed within the packing box holes 17 in order to couple the packing boxes 16 to a connecting cylinder flange 26, and thus connect the bent tube subassembly 30 to the port connection subassembly 20. The packing boxes 16 also include a tube end fluid opening 18. The tube end fluid opening 18 is coaxial with the opening in the tube 12 and an opening (not shown) in the clamping flanges 14. High pressure hydraulic fluid flows through the tube 12 and the opening 18, moving from one hydraulic component to another hydraulic component. In exemplary embodiments, the bent tube subassembly 30 is configured to transfer hydraulic fluid at pressures greater than approximately 100 bar, and at flows greater than approximately 380 liters per minute.

Referring now to FIG. 7, the front of the bent tube subassembly 30 of FIG. 6 is shown. FIG. 7 shows the alignment of the packing box 16 and the clamping flange 14. The packing box 16 is rectangular in shape and is positioned vertically and adjacent to the clamping flange 14, providing clearance for inserting the tension rods 28 (shown in FIG. 3) into the flange apertures 15. In this embodiment, the packing box holes 17 are enlarged to a diameter greater than the diameter of the locking assembly 22 and are capable of receiving the locking assembly 22 from the front (according to FIG. 7 perspective). Therefore, full clearance for the holes 17 from the clamping flanges 14 is intended not to be necessary.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the systems and methods for providing the hydraulic tube assembly as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

INDUSTRIAL APPLICABILITY

The disclosed hydraulic tube assembly may be utilized in any high pressure, high flow hydraulic system, including but not limited to hydraulic mining equipment. The disclosed hydraulic tube assembly is intended to connect two points that are out of alignment within a high pressure, high flow hydraulic system, and particularly two points that are out of alignment in more than one plane.

Conventional hydraulic joints often leak or fail when used in high pressure, high flow hydraulic systems because the burst pressure falls below the working limit of the system. Thick walled tubes may have large tolerance ranges, and the tolerance stacking may create a hydraulic system with two connection points that are out of alignment in more than one plane. The hydraulic tube assembly of the present disclosure is intended to connect two points that are out of alignment in more than one plane within a high pressure, high flow hydraulic system, while also reducing leaks or failures of the system.

It will be apparent to those skilled in the art that various modifications and variations can be made to the disclosed hydraulic tube assembly. Other embodiments will be apparent to those skilled in the art from consideration of the specification and practice of the disclosed hydraulic tube assembly. It is intended that the specification and examples be considered as exemplary only, with a true scope being indicated by the following claims and their equivalents.

What is claimed is:

1. A hydraulic tube assembly for connecting two hydraulic components in a hydraulic system, comprising:
    a first hydraulic component;
    a second hydraulic component;
    a tube subassembly, comprising:
        a tube having two ends, the tube configured to transfer high pressure, high flow hydraulic fluid between the first hydraulic component and the second hydraulic component;
        a first packing box coupled to a first tube end;
        a second packing box coupled to a second tube end;
    at least one port connection subassembly having two ends, a first port connection subassembly end coupled to the tube subassembly, a second port connection subassembly end configured to couple to at least one of the hydraulic components, the port connection subassembly comprising:
        a packing box flange configured to couple to the at least one of the hydraulic components;
        at least one tension rod having two ends, a first tension rod end coupled to the tube subassembly, a second tension rod end coupled to the packing box flange;
        a connecting cylinder flange having two ends, a first cylinder flange end disposed within the packing box flange, and a second cylinder flange end disposed within the tube subassembly, the connecting cylinder flange being coupled to the tube subassembly; and
        at least one fluid seal disposed between the connecting cylinder flange and the tube subassembly.

2. The hydraulic tube assembly of claim 1, wherein the hydraulic tube assembly includes two port connection subassemblies, each port connection subassembly having two ends, a first port connection subassembly first end coupled to the first packing box, a first port connection subassembly second end coupled to the first hydraulic component, a second port connection subassembly first end coupled to the second packing box, a second port connection subassembly second end coupled to the second hydraulic component.

3. The hydraulic tube assembly of claim 2, wherein the hydraulic tube assembly is configured to provide a fluid connection between the first hydraulic component and the second hydraulic component.

4. The hydraulic tube assembly of claim 3, wherein the packing box flange includes at least one packing box flange seal disposed within the inner diameter of the packing box flange, the at least one packing box flange seal disposed adjacent to the connecting cylinder flange and configured to reduce fluid loss from the hydraulic tube assembly.

5. The hydraulic tube assembly of claim 4, wherein the packing box flange includes three packing box flange seals.

6. The hydraulic tube assembly of claim 3, wherein the fluid seal is an o-ring.

7. The hydraulic tube assembly of claim 3, wherein the packing box flange includes at least one flange hole configured to receive a flange locking assembly, wherein the at least one flange hole is enlarged to a diameter greater than the diameter of the flange locking assembly.

8. The hydraulic tube assembly of claim 7, wherein the packing box flange is configured to adjust the port connection subassembly in at least two planes while maintaining a fluid connection between the two hydraulic components.

9. The hydraulic tube assembly of claim 1, wherein the tube is bent so that the first tube end and second tube end are substantially perpendicular to each other, and the tube is configured to connect the first hydraulic component and the second hydraulic component.

10. The hydraulic tube assembly of claim 1, wherein the connecting cylinder flange is configured to move in a plane substantially perpendicular to the surface of at least one hydraulic component, wherein the at least one tension rod is configured to limit the motion of the connecting cylinder flange relative to the packing box flange, so that a fluid seal is maintained within the hydraulic tube assembly.

11. The hydraulic tube assembly of claim 1, wherein the hydraulic tube assembly is configured to transfer hydraulic fluid at pressures greater than approximately 100 bar, and at flows greater than approximately 380 liters per minute.

12. The hydraulic tube assembly of claim 1, wherein the tube has an inner diameter greater than approximately 63.5 millimeters.

13. A high pressure hydraulic tube subassembly, comprising:
    a tube having a first tube end and a second tube end, the tube configured to transfer high pressure, high flow hydraulic fluid between a first fixed hydraulic component and a second fixed hydraulic component;
    a first packing box, including a first packing box first end coupled to the first tube end, and a first packing box second end configured to couple to the first fixed hydraulic component;
    a second packing box, including a second packing box first end coupled to the second tube end, and a second packing box second end configured to couple to a port connection subassembly; and
    the port connection subassembly coupled to the second packing box at a first port connection subassembly end, wherein the port connection subassembly is configured to couple to the second fixed hydraulic component at a second port connection subassembly end having a packing box flange configured to fluidly connect the tube to the second fixed hydraulic component, wherein the port connection subassembly includes a connecting cylinder flange having a first cylinder flange end disposed within the packing box flange and a second cylinder flange end disposed adjacent to the second packing box, the connecting cylinder flange being coupled to the second packing box;
    wherein the packing box flange includes at least one flange hole configured to receive a locking assembly for coupling to the second fixed hydraulic component and the at least one flange hole is enlarged to a diameter greater than the diameter of the flange locking assembly;

wherein the port connection subassembly is adjustable to provide movement of the tube in a first plane relative to the second fixed hydraulic component when the port connection subassembly is coupled to the second fixed hydraulic component, and wherein the oversized flange hole of the packing box flange provides adjustment of the tube subassembly in a second plane relative to the second fixed hydraulic component when the port connection subassembly is coupled to the second fixed hydraulic component.

14. The tube subassembly of claim 13, wherein the tube subassembly is adjustable in the first and second plane relative to the second fixed hydraulic component when coupled to the second fixed hydraulic component to provide a fluid connection between the first fixed hydraulic component and the second fixed hydraulic component in a hydraulic system.

15. The tube subassembly of claim 14, wherein the tube is bent so that the first tube end and second tube end are substantially perpendicular to each other, and the tube is configured to connect the first fixed hydraulic component and the second fixed hydraulic component.

16. The tube subassembly of claim 14, wherein the tube is configured to transfer hydraulic fluid at pressure greater than approximately 100 bar and at flows greater than approximately 380 liters per minute.

17. The tube subassembly of claim 14, wherein the tube has an inner diameter greater than approximately 63.5 millimeters.

18. The tube subassembly of claim 14, further comprising at least six packing box seals, wherein at least three first packing box seals are coupled to the first packing box, and at least three second packing box seals are coupled to the second packing box.

19. A port connection subassembly configured to fluidly connect a fixed hydraulic component to a tube subassembly, the port connection subassembly comprising:

a packing box flange configured to couple to the fixed hydraulic component;

a tension rod having, a first tension rod end coupled to the packing box flange, and a second tension rod end configured to couple to the tube subassembly;

a connecting cylinder flange having a first cylinder flange end disposed within the packing box flange, and a second cylinder flange end configured to be disposed within the tube subassembly, the connecting cylinder flange being configured to couple to the tube subassembly; and a fluid seal configured to seal the port connection subassembly from fluid leaks, wherein the cylinder flange is configured to move relative to the fluid seal adjacent to the packing box flange, and wherein the fluid seal is configured to fluidly seal the port connection subassembly between the packing box flange and the cylinder flange when the packing box flange is coupled to the fixed hydraulic component and when there is relative motion between the cylinder flange and the fluid seal;

wherein the packing box flange includes at least one flange hole configured to receive a flange locking assembly, wherein the at least one flange hole is enlarged to a diameter greater than the diameter of the flange locking assembly.

* * * * *

UNITED STATES PATENT AND TRADEMARK OFFICE
CERTIFICATE OF CORRECTION

PATENT NO. : 8,979,139 B2  
APPLICATION NO. : 13/621774  
DATED : March 17, 2015  
INVENTOR(S) : Lawson et al.

Page 1 of 1

It is certified that error appears in the above-identified patent and that said Letters Patent is hereby corrected as shown below:

Title Page, Item 73 (Assignee), line 1, delete "Catepillar" and insert -- Caterpillar --

Signed and Sealed this  
Twenty-third Day of August, 2016

Michelle K. Lee  
*Director of the United States Patent and Trademark Office*